Aug. 31, 1965 R. HAGEN 3,204,018
METHOD OF FORMING HOLLOW PLASTIC ARTICLES
Filed Nov. 18 1964 3 Sheets-Sheet 1

INVENTOR
Reinold Hagen
BY

Aug. 31, 1965   R. HAGEN   3,204,018
METHOD OF FORMING HOLLOW PLASTIC ARTICLES
Filed Nov. 18 1964   3 Sheets-Sheet 2
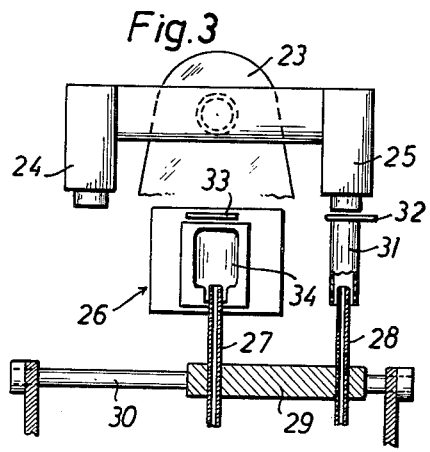
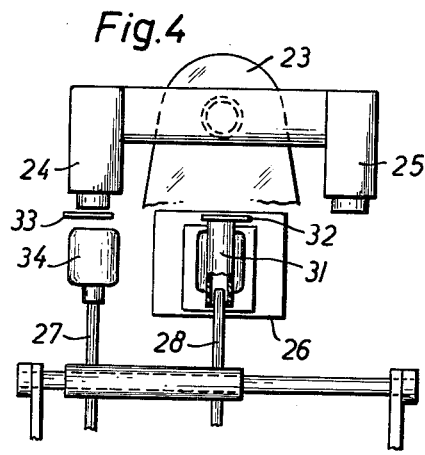
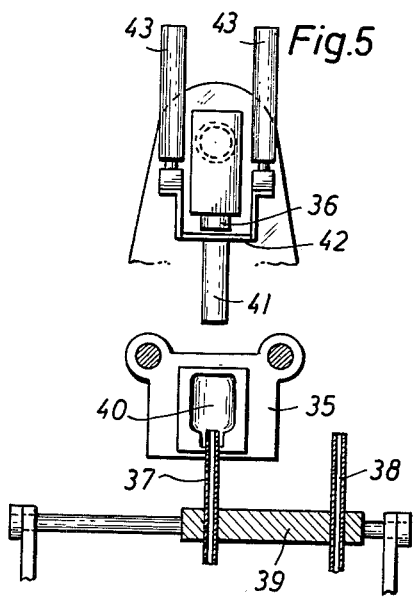
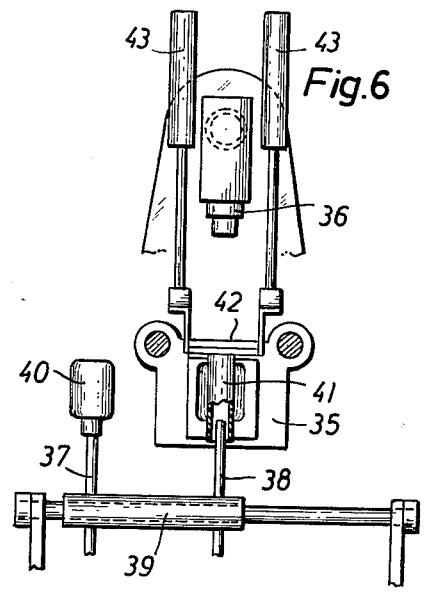
INVENTOR
Reinold Hagen
BY Aug. 31, 1965 R. HAGEN 3,204,018
METHOD OF FORMING HOLLOW PLASTIC ARTICLES
Filed Nov. 18 1964 3 Sheets-Sheet 3
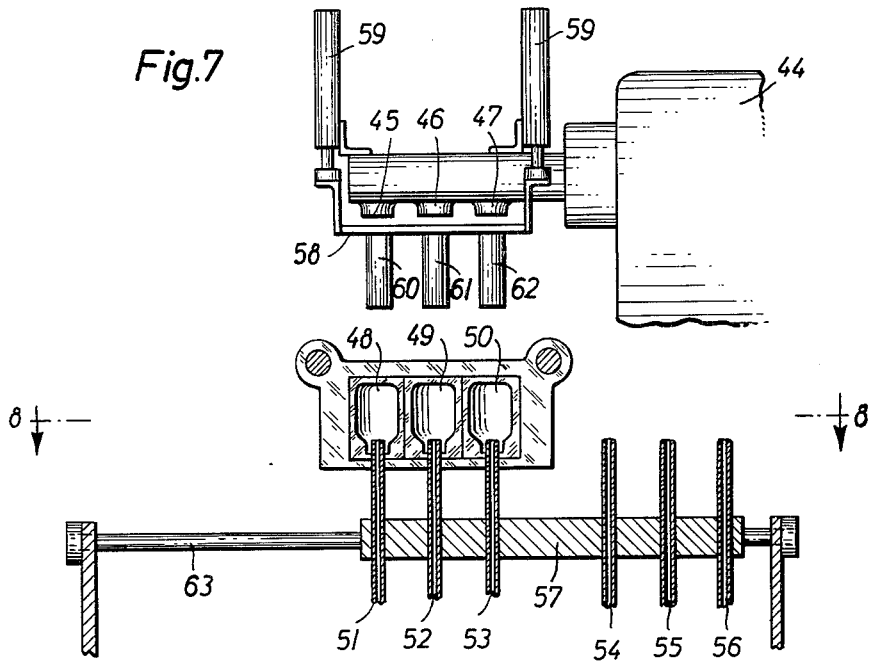
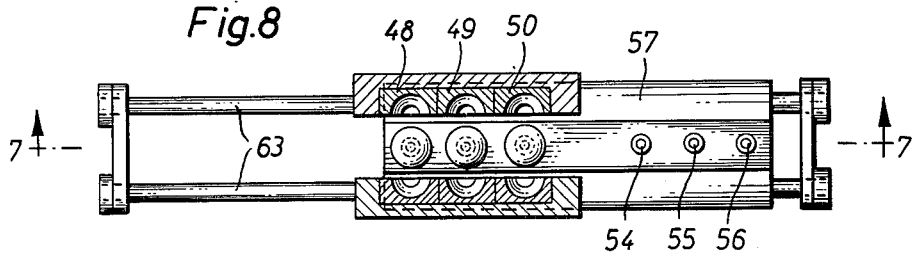
INVENTOR
Reinold Hagen
BY ID# United States Patent Office 3,204,018
Patented Aug. 31, 1965

3,204,018
METHOD OF FORMING HOLLOW PLASTIC
ARTICLES
Reinold Hagen, Haugelar uber Siegburg,
Rhineland, Germany
Filed Nov. 18, 1964, Ser. No. 414,494
Claims priority, application Germany, May 18, 1960,
K 40,752
10 Claims. (Cl. 264—98)

This invention relates to the manufacture of bottles and other hollow articles from plastic materials, and more particularly to a method of forming such articles by blowing.

The term "hollow articles" is understood to comprise hollow bodies of any shape, provided the shape of a hollow embryo article, while in condition of plasticity, permits its being blown by fluid pressure to the desired final shape.

This application is a continuation-in-part of my co-pending application Serial No. 120,828, filed May 16, 1961 and entitled "Process for Making Hollow Plastic Articles."

For the purpose of the invention, any plastic material may be used which is capable of becoming softened and workable when heated to a relatively low temperature and which, while soft and workable, will permit a hollow embryo article to be expanded under fluid pressure to the desired shape. Blown articles, while cooling become gradually rigid. For instance, low, medium and high density polyethylene, polystyrene, plasticized and nonplasticized polyvinyl chloride and nylon may be used.

A number of processes have heretofore been suggested to blow articles from plastic materials, ordinarily, but not necessarily, starting with material in form of tubing, and numerous attempts have been made to provide suitable apparatus to carry out such processes.

One object of the present invention is to improve the manufacture of hollow plastic articles by blowing.

In producing bottles, other containers and other hollow articles from plastics, for instance, by extruding and blowing, an extrusion press and a sectional mold, preferably a two-section mold, are generally used. An open-ended tube may be extruded from an annular extrusion nozzle above the mold to suspend into the space between the open sections of the mold to slip over a so-called blow pipe which projects into the open mold space from opposite the extrusion direction and in alignment with the extruded tube. As soon as a sufficient length of the open-ended tube is extruded, the mold sections are closed upon a portion of the tube, which causes the tube to be pinched shut by the mold sections near the nozzle. At the tube end remote from the nozzle, the material is pressed against and around the blow pipe. The blow pipe serves as a core to help form an opening in the article to be blown, for instance, the neck of a bottle, and it also serves to admit compressed air or any other fluid pressure medium into the closed tube portion within the closed mold. The fluid pressure medium admitted through the blow pipe expands the mold-enclosed tube portion against the wall of a mold cavity, where the molded article cools off and becomes rigid.

Thus, the cycle of operations of the referred to type of blow-molding machine using freshly extruded preforms generally comprises the steps of extruding a preform into the space between open mold sections, closing the mold sections and thereby forming a hollow embryonic article within the closed mold, the embryonic article being closed except for an opening for the admission of an inflating medium, inflating the embryonic article into contact with the walls of a mold cavity, allowing the inflated or blown article to cool and to become rigid within the mold, opening the mold, and ejecting the rigid article.

It has been known for a long time that the period required by a freshly blown article to cool and to become rigid within a mold is relatively long and does not allow the mold to be as fully utilized as it is desirable. With known apparatus to produce hollow plastic articles in a continuous operation, no full advantage could ordinarily be taken of the highest possible rates of extrusion. Generally, it was required to slow down the rate of extrusion to adjust same to the capacity of the facilities for forming the article. This reduces the otherwise possible output of molds and unfavorably influences the economy of blow-molding.

The primary object of the present invention centers about a method of forming hollow plastic articles by blowing, whereby the molding cycle is considerably shortened. The invention has for its purpose extruding at the highest possible rate and to form the finished article as quickly as will be required by such rate of extrusion. Thus, my invention aims at speeding up and cheapening the manufacture of hollow plastic articles, that is, at an increase in output without an increase in the initial and manufacturing costs.

To increase the rate of production rotary turrets have been suggested which carry a number of molds and are operated to move the open sections of one mold after the other into registry with an extrusion head. Such turntable constructions, however, in addition to calling for a plurality of molds, are complicated, of large dimensions, expensive, and require a large floor space.

To compensate for the long period needed by a freshly blown article to cool and become rigid within a mold and to make extrusion at any rate of speed possible, it has also been suggested to move a mold which is arranged underneath an extrusion nozzle, after the mold has been closed upon a portion of an extruded preform, downwardly away from the nozzle. In this way, the closed mold makes room for the plastic preform as it is extruded and as it lengthens in the downward direction.

The present invention rests on a new concept. When a plastic preform has been introduced in an open mold in a hot condition, that is, in condition of plasticity, and the preform, after closing of the mold, has been expanded to the desired shape, the blown article does not solidify suddenly. Instead, the cooling and solidification take place gradually. In the course of solidification, that is, during the change from plasticity to rigidity, the plastic material passes through a number of more or less distinctive states. The solidification progresses from the outer wall of the blown article toward the inner wall, but there is also another, less pronounced, progress in the solidification, which takes place from the inner wall of the blown article toward the interior of the wall. Actually, the outer layers of the blown article solidify before the interior of the wall does. I have found that a blown article, upon a preliminary solidification, reaches what will be referred to hereinafter as an incompletely solidified or a self-supporting condition. In this condition, the blown article appears cooled and solidified to such an extent that it can support itself and no longer requires the support of the mold. My invention has for one of its main purposes the provision of steps which will make it possible to take advantage of this self-supporting property of a blown article. Bearing this in mind, it will be appreciated that the invention shortens the total molding cycle, which includes mold-closing time, blowing time, solidifying time, and mold-opening time, by decreasing the solidifying time. It will be understood that the self-supporting quality inherent in the structure and nature of a presolidified blown article can be enhanced by maintaining overpressure within the article.

The purpose of this invention of shortening the molding cycle and utilizing molds more fully cannot be served unless the cold used is opened as soon as the presolidified blown article has acquired self-supporting quality, the article is promptly removed from the mold, and the removal of the article which is still liable to deformations is done safely, and unless the further utilization of the mold takes place without delay. The article has to be given the opportunity to solidify to completion outside the mold. Other objects of the present invention center, therefore, about steps which will ensure the timely and safe removal of a presolidified blown article from its mold and prompt recharging of the mold, and will make additional cooling and solidification outside the mold possible. The premature removal of blown articles from a mold permits charging of the mold with preforms at a faster rate.

Still further objects will be apparent from the following description.

In carrying out the method of my invention, I use a mold which includes opposing sections to be closed and opened, and at least two cores to cooperate with the mold. The mold defines, when closed, a cavity conforming in shape to the article to be formed. It will be understood that the mold may define more than a single cavity as well. If the mold used encloses, for instance, two cavities, at least two cores are used for each of the two cavities. Also, wherever this specification and the appended claims speak of a mold defining a cavity, such mention is meant also to cover the use of more than a single mold. Essentially, a mold defining, for instance, two cavities is in effect identical with two molds, each defining a single cavity.

Broadly, my method includes the steps of providing a continuous hollow preform of plastic material in condition of plasticity, and placing a length of said preform into the space between open opposing sections of a mold. Said length has a longitudinal axis and is placed into the open mold space so that said axis extends vertically. The method provides further that the open mold be closed, an inflatable embryo article be thereby formed from the referred to length within the closed mold, and a fluid pressure medium be admitted to the embryo article to expand the latter into molding contact with the mold cavity. Then, according to the method of the invention, the closed mold is opened at a time when the expanded or blown article has reached a self-supporting but still incompletely solidified state. The thus blown article has an axis which coincides with the axis already mentioned, and is supported by a first core. The core together with the blown article is withdrawn from the open mold, while the blown article is still incompletely solidified. The axis of the incompletely solidified article moves during the withdrawal of the article parallel to itself, that is, vertical. The withdrawn incompletely solidified article is allowed to solidify to completion outside the mold, while being kept vertically. The mold being utilized without interruption, a fresh length of the preform is placed into the open mold, and the steps which will lead to the conversion of the fresh length over a fresh embryo article into a freshly blown incompletely solidified article and to the completion of the solidification of the fresh incompletely solidified article are repeated. A second core is used to support the fresh incompletely solidified article. The incompletely solidified article supported by the first core has solidified completely, and the completely solidified article is taken off the first core.

One of the prime requisites of my method is to make sure that the incompletely solidified or presolidified article be not subjected to any undue stress. This most important and critical requirement is satisfied by providing that the presolidified article be produced in vertical condition and be so held up to the completion of the solidification. For this purpose, the embryo article is produced to be in a vertical position and to be blown into a vertically positioned presolidified article. The latter must remain in a vertical position while it is moved out of the open mold and while it solidifies completely or to full rigidity.

The specification is accompanied by drawings in which:

FIG. 3 is an elevation, partly sectioned, of another apparatus for practicing the invention;

FIG. 4 is a view similar to that of FIG. 3, but showing the apparatus in another operational position;

FIG. 5 is a view of still another apparatus;

FIG. 6 is a view similar to that of FIG. 5, but again showing another operational position;

FIG. 7 is a vertical section of a further apparatus for performing my method, taken in the plane of the line 7—7 of FIG. 8; and FIG. 8 is a horizontal section taken in the plane of the line 8—8 of FIG. 7.

Figure 1:
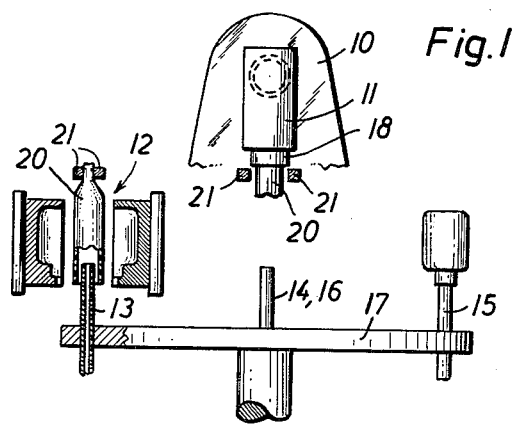
FIG. 1 illustrates in a side elevational view, partly sectioned, an apparatus for carrying out the method of this invention.
Figure 2:
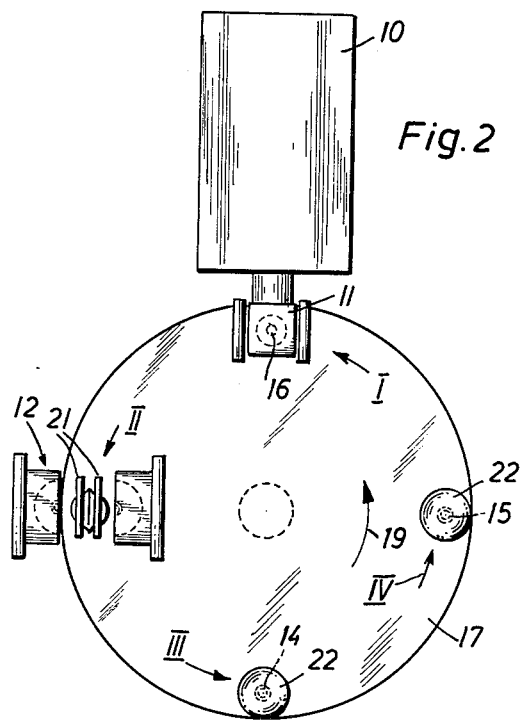
FIG. 2 shows the apparatus of FIG. 1 in a plan view.

Referring to the drawings in greater detail, and initially to FIGS. 1 and 2, there is an extruder 10 which is provided with an extrusion head 11. The latter is downwardly directed. A mold generally designated 12 cooperates with four vertically extending cores 13, 14, 15, and 16, which are fixedly mounted on a turntable 17, 90° apart from each other. The cores are also used as blow pipes. In the condition shown, the blow pipe 16 is underneath an extrusion nozzle 18 of the extrusion head 11. The blow pipes 16 and 14, in position I and III, respectively, are opposite each other, and a line connecting the positions I and III is parallel to the longitudinal axis of the extruder 10. Blow pipes 13 and 15, in position II and IV, respectively, are shown along a line perpendicular to the line connecting positions I and III. The extrusion head 11 and the mold 12 are set apart 90°. The mold is above the table 17 and is shown in open condition. The blow pipe 13 projects upwardly into the open space between the mold sections.

The arrangement of the four blow pipes is such that the blow pipe 16, while the revolving table 17 is turned through 90° in the direction of the arrow 19, moves away from the position I to assume the position II, the latter position having previously been that of blow pipe 13. The pipe 13 takes the place previously held by the blow pipe 14, position III. It will readily be understood that while the blow pipes 16 and 13 move to the position previously held by blow pipe 14 and 13, respectively, the blow pipe 14 moves to position IV, previously held by blow pipe 15, and the latter moves to the previous position of the blow pipe 16, position I. The blow pipes do not change the spatial relation one to the other, while they turn.

The apparatus of FIGS. 1 and 2 is operated by extruding a plastic tube 20 from the extrusion nozzle 18. The tube is open at its free or leading end. Since the blow pipe 16 extends from opposite the extrusion direction and in alignment with the extruded tube, the free tube end slips over the blow pipe 16. As soon as an adequate length of tubing has been extruded, two jaws 21 of a clamp grasp the tube at a place near the nozzle 18, and a tube segment is then severed from the parent body of plastic material in the nozzle. The severing is effected between the clamp 21, 21 and the underside of the nozzle 18, the severing means being not shown. The clamp 21, 21 helps the blow pipe 16 to support the severed tube segment. Any other suitable supporting means may be used instead of the clamp 21, 21. The table 17 is now turned 90°, and as the table turns both the blow pipe 16, which is carried by the table, and the clamp 21, 21 also turn. The clamp is actuated to grasp and to release and to reciprocate between the positions I and II by means which may be of any design and are not shown. Being held on its top by the clamp and at its bottom by the blow pipe 16, the severed tube segment is safely transported in a vertical condition along a 90° arc to arrive in the position II and to be received in the open space between the sections of the mold 12.

In FIG. 1, a severed tube segment 20 is shown to be slipped over, and vertically supported by, the blow pipe 13 and to be tightly held by the clamp 21, 21.

In the sequence of operations, the blow pipe 13 precedes the blow pipe 16. Upon arrival of a tube segment in the position II, the mold sections close upon the transported tube segment, whereby mold edges pinch the tube and convert the tube segment in a bubblelike formation closed at the top and open at the bottom. In the showing of FIGS. 1 and 2, it is the blow pipe 13 against which the tubular bottom portion of the pinched off bubble is press-molded. The bubble constitutes an embryonic form of the hollow article to be blown. Next, compressed air or any other fluid pressure medium is blown through the blow pipe 13 into the bubble to expand the embryo form to the shape of the desired article.

When the mold 12 has been closed upon the tube segment 20 and an article has been blown therefrom, and when the mold has again been opened, the table 17 is again turned 90°. The blow pipe 13 carrying the blown article 22 moves to the position III.

It is an important feature of the present invention that the mold, contrary to established practices, is opened before the plastic material is fully solidified. Up to now, a blown article was removed from its mold after the article had solidified to such an extent that, for all practical purposes, it could no longer be deformed. The invention provides the removal of a blown article as soon as it is just self-supporting, that is, as soon as it can withstand a deforming action by its own weight. A most important feature of this invention is that the self-supporting article, upon opening of the mold, is moved and held in vertical condition until it is fully solidified so that a tendency of the weight of the article, which would otherwise cause deformation, will be safely checked. The movement is shown in FIGS. 1 and 2 to be horizontal but could take place in any other manner provided the article, as long as it is incompletely solidified but self-supporting, is kept vertically. The self-supporting property may be helped, as has already been stated, by maintaining interior overpressure.

The blown article 22, as it moves out of the mold toward the position III, is strong enough not to collapse but to support itself. While moving to position III, a solidification station, the article cools and solidifies further, and the article is given opportunity to cool still further and to solidify completely, while moving on through another 90° arc to the position IV, another solidification station. At the latter place, the article 22 is taken off its respective blow pipe.

The turntable rotates intermittently, each movement going through 90°. It will be understood that the timing of the sequences involved is such that whatever is provided to occur during each 90° movement and during each subsequent standstill in each of the positions I to IV will be completed before the turntable turns again, except for the extrusion which is continuous. As for the extrusion, the free end of the tube that is being extruded will be ready to slip over a blow pipe when the latter, coming from the position IV, reaches the position I. In the position I, the jaws 21, 21 grasp the tube when a length of tube is to be severed and moved toward the position II. And in the position II, the mold which has opened to release a previously blown article closes upon the tube length just introduced and then opens again to release the article last blown.

In the apparatus shown in FIGS. 1 and 2, there are four blow pipes provided which pass one after the other through four working stations. In the position I, a length of tube is severed from the parent plastic body, and in the position II, the severed tube length is blown to the desired article. Thus, two positions or two blow pipes are available for additional cooling and solidifying, or about one half of the time needed for the whole cycle of operations is used for further cooling and solidification, in addition to the preliminary cooling and solidification that takes place within the mold. Due to the decrease in dwelling time of the blown article in the position II and due to the provision for further cooling in the positions III and IV before the blown article is removed from its supporting blow pipe, the highest possible rate of extrusion may be employed, making it at the same time possible to deal with the extruded material in a continuous manner.

The construction of FIGS. 1 and 2 uses a single extrusion press and a single mold. As for prior single-mold constructions, the present construction adds only three blow pipes and a turntable, which, in view of the relatively high initial cost of the extrusion press and mold, require no additional cost of any consequence, especially in the light of the increase in output ensured by the present construction. A turntable as shown may, of course, be replaced by a simple crosslike support or the like.

It will be apparent that the number of blow pipes may be varied, depending on prevailing conditions. A thick-walled blown article requires more additional cooling and solidifying time than a thin-walled article. The clamp 21, 21 has been stated to reciprocate between the positions I and II. It is to be understood that each blow pipe may be associated with a clamp of its own so that the clamps would rotate synchronously with the blow pipes.

Having now reference to the apparatus shown in FIGS. 3 and 4, the apparatus includes an extrusion machine 23 provided with two spaced nozzles 24 and 25. Centrally with respect to, and below, the nozzles is a two-section mold 26 which cooperates with two blow pipes 27 and 28. These blow pipes are carried by a common slide 29 and extend upwardly from the slide, the slide being guided by a rail 30 for reciprocation. The rail is parallel to a line connecting the extrusion nozzles 24 and 25 and lies in a plane that coincides with the parting plane of the mold. The mold opens and closes in directions perpendicularly to the parting plane of the mold and to the plane in which the rail 30 and the extrusion nozzles 24 and 25 lie.

In the working conditions illustrated in FIG. 3, the blow pipe 28 extends in alignment with a tube which is extruded from the nozzle 25 so that a portion of the free end of the tube slips over the blow pipe 28. As soon as a sufficient length 31 of the tube is extruded, a clamp 32 or the like grasps the tube and severs the desired tube length from the parent plastic body in the nozzle 25. The severing means is not shown. It will be clear that a grasping device may be provided which will perform both the grasping and severing.

From FIG. 3, it will further be seen that the blow pipe 27 projects into a blown bottle 34 within the mold 26, the latter being shown in closed condition.

As soon as the bottle 34 has been blown and has become self-supporting, the mold 26 opens and the slide 29 is moved to the left, when viewing toward the drawing, to assume the position shown in FIG. 4. The slide 29 carries the blow pipes 27 and 28 along. The blow pipe 27 takes the bottle 34 along which is in a presolidified state, and the blow pipe 28 brings the tube length 31 into the open mold space to be blown to the next bottle after the mold has closed and a fluid pressure medium has been admitted to the tube length. The arrangement of the mold 26 is such that the mold sections when open permit the movement of the blow pipes 27 and 28 through the open mold space.

Concurrently with the movements of the slide 29 and blow pipes 27 and 28 to the left, the clamp 32 as well as another clamp 33 also move to the left. It will be apparent that the blow pipe 28 and the clamp 32 support the severed tube segment 31, while the blow pipe 27 supports and carries the blown bottle 34.

Upon arrival and complete solidification of the bottle 34 in the position shown in FIG. 4, the bottle is removed from the blow pipe 27 which has come to lie under the nozzle 24. The bottle may, for instance, be ejected by a short burst of air. A tube is extruded from the nozzle 24 to slip with a portion at the leading end thereof over the blow pipe 27. The clamp 33 grasps the tube, and a length of tube is severed from the parent plastic material to be moved to the right while being supported by the blow pipe 27 and the clamp 33. This movement to the right is effected by a movement of the slide 29 to the right, that is, back to the position shown in FIG. 3.

By the time that the slide 29 is ready to be moved back to the right, a new bottle has been blown, which, upon opening of the mold and upon being supported by the blow pipe 28, also moves to the right. Along with the blow pipes 27 and 28 travels the clamp 33 and 32, respectively.

The blow pipes 27, 28 extend vertically and move horizontally. Thus, each freshly blown article, as long as it is in a presolidified state, is supported by a blow pipe to extend likewise vertically.

The construction of FIGS. 3 and 4 is intended for thin-walled bottles or containers. The time for additional cooling is short.

However, it is to be understood that the principle of the construction of FIGS. 3 and 4 may easily be adapted to longer additional cooling by providing a longer rail and setting the blow pipes further apart, so that a blow pipe carrying a blown article will not come, upon leaving the blowing station, immediately below an extrusion nozzle but will pass through an intermediate station first. Applied to the showing of FIGS. 3 and 4, there would be either an idle station on each side of the mold between the mold and the extruding stations or just a longer travel distance.

If it is desired to extend the time of additional cooling, advantage may also be taken of an arrangement according to which the traveling paths of the cores extend between two levels of height. In an arrangement somewhat similar to that of FIGS. 3 and 4, the mold may be provided at a lower level, for instance, a level lower by the length of tube needed for the manufacture of the desired article, so that additional cooling time will be gained by moving a blow pipe together with an article in a freshly blown presolidified state thereon first sideways out of the open mold and then to the higher level. The movement between the two levels may be vertical, curved, or in any inclined direction. It is essential, however, that the presolidified article be always kept in a vertical position.

In the construction of FIGS. 5 and 6, a mold 35 is spacedly provided vertically below an extrusion nozzle 36. The distance between mold and nozzle may, for instance, be equal to the length of tubing that is required for the blow-molding of the desired article. The distance may as well be shorter or longer. Two blow pipes 37 and 38, slidingly mounted on a slide 39, cooperate with the mold 35.

In the condition shown in FIG. 5, a blown bottle 40 appears in the closed mold, and the blow pipe 37 projects into the neck of the bottle. While the bottle is formed, a tube 41 is extruded to suspend vertically downwardly into the space between the nozzle 36 and the mold 35. As soon as the blown bottle has become self-supporting, the mold is opened, and the slide 39 is moved from the right position of FIG. 5 to the left position of FIG. 6. As the slide 39 moves to the left, the blow pipes 37 and 38 move to the left, the former carrying the bottle 40 and giving the bottle additional cooling time and the opportunity to solidify more strongly, the latter entering the open mold 35. A clamp 42 grasps the tube 41. A segment of the tube supported by the clamp 42 is severed from the parent plastic body and lowered and introduced into the open mold, the free end of the tube segment being slipped over the blow pipe 38. When the mold closes upon the severed tube segment for the admission of a fluid pressure medium and for the formation of a new bottle, the clamp 42 moves up to be ready to seize the next tube segment.

The construction of FIGS. 5 and 6 affords additional cooling and solidifying time as do the construction of FIGS. 1 and 2 and 3 and 4, respectively. The blown article has the same amount of time for additional solidifying as is required for the extrusion and blow-molding. However, in the case of FIGS. 3 and 4, the stations for additional solidifying coincide with the extrusion stations, so that the time for additional solidification is comparatively shorter.

In FIGS. 5 and 6, two pneumatically or hydraulically operated cylinders 43, 43 are shown, by way of example, to actuate the clamp 42.

The apparatus illustrated in FIGS. 7 and 8 ensures a still greater increase in output. It includes an extruder 44 provided with three nozzles 45, 46, and 47. Each of these nozzles is associated with a two-sectional mold of its own, the molds being designated 48, 49, and 50. The apparatus includes further two sets of three blow pipes each, designated 51, 52, 53 and 54, 55, 56, respectively. All of these six blow pipes are supported by a common slide 57, which is guided by rods 63, 63. A clamp 58 which is actuated by pneumatically or hydraulically operated cylinders 59, 59 serves to grasp extruded tubings 60, 61, 62 and to transport portions thereof, severed from the parent bodies of plastic in the nozzles, downwardly to introduce same into the open spaces between the sections of each of the molds.

The construction of FIGS. 7 and 8 is similar to that of FIGS. 5 and 6, except that in the former there are three molds rather than a single mold, and two sets of three blow pipes rather than two blow pipes or two sets of a single blow pipe. The operation of the apparatus of FIGS. 7 and 8 is also similar to that of the apparatus of FIGS. 5 and 6. The apparatus of FIGS. 7 and 8 extrudes three tubes 60, 61, 62 simultaneously to suspend freely into the open mold spaces, and to make the leading end of each of the tubes slip over one of the blow pipes of one and the same set. After the molds have been closed over the three severed tube lengths, and the three embryo articles within the molds expanded, the blown articles, upon opening of the molds, are removed from the molds by moving the slide 57. When the slide, together with the blow pipes 51, 52, 53 and the blown articles carried by these blow pipes, is moved to the left, the blow pipes 54, 55, 56 move into the open mold spaces and are ready to receive fresh tubing lengths for the next blow-molding cycle.

It is believed that the construction and operation of the various apparatus, as described hereinbefore, and the method of the invention, as well as the many advantages of my method, will be fully understood from the foregoing detailed description. Some of the features and advantages of the method of the invention are reviewed hereinafter.

One of the great advantages offered by my invention is to make a high rate of extrusion possible. It has been suggested, as has already been pointed out, to use more than a single mold to compensate for the time needed by a freshly molded article to solidify, while within a closed mold. The present method uses a single mold in association with at least two cores, so that one of the cores, which supports a presolidified article, may be removed from the open mold, and the other core may be introduced into the open mold space to permit the extrusion to continue at a high rate and the molding of the next cycle to be carried out. In the apparatus of FIGS. 1 and 2 a single mold is used together with four cores, and in the apparatus of FIGS. 3, 4 and 5, 6, respectively, a single mold is used with two cores. In the apparatus of FIGS. 7 and 8 three molds are used together with six cores, which corresponds to the combination of a single mold with two cores. Thus, a higher rate of extrusion is achieved, according to this invention, by using a mold in combination with more than a single core. This in itself constitutes another important advantage since it increases the output of a blow-molding installation practically without increase of the initial cost. The same mold serves to form an inflatable embryo article and is used for the blow-molding. In carrying out the method of my invention, I prefer to combine extruding and blow-molding.

A group of features of the present method includes: Interruption of the usual complete course of solidification of a blown article within its mold; the mold is opened at the time when the blown article has not completely solidified but has reached a self-supporting state in which it can be moved if the steps are taken, which are recapitulated immediately hereinafter; the incompletely solidified article is moved from the open mold; and a fresh starting length of tubing or of the preform used is introduced into the open mold as the previously blown article is removed.

Inseparably associated with the aforelisted features is a group of other features: The starting length of tubing or of the preform used, generally of elongated shape, is introduced into an open mold to extend therein vertically. It is formed first into a vertically extending embryo article, ordinarily simply by closing the mold about the starting length, and then into a shaped article. The shaping is done by blow molding. The incompletely solidified article thus formed is moved from the open mold and allowed to fully solidify outside the mold. It is kept vertically up to the completion of the solidification.

The drawings and foregoing description deal with single-cavity molds, but it will be understood that molds having more than a single cavity may be used as well, provided the apparatus uses more than a single core for each of the cavities, making it possible for one core to be moved out of an open cavity space together with a presolidified blown structure for completion of the solidification while another core moves into an open cavity space. For instance, in FIGS. 7 and 8 three forms are shown. It will readily be appreciated that three cavities in a single form could be used instead.

In accordance with today's general industrial trends to increase production rates, the concept and development of machinery for making hollow plastic articles aims at using in one and the same apparatus more than a single mold. The present invention ensures an increase in output by reducing the dwelling time for a freshly molded article within a closed mold and by making sure that an incompletely solidified article be not deformed during the time interval between what might be referred to as a premature mold opening and the completion of the solidification. With two molds in the same apparatus, the increased output is doubled, and with three and four molds, it is trebled and quadrupled, respectively.

It will be appreciated that it is within the scope of this invention to use cores or blow pipes in any way other than shown, provided the blow pipe is capable of carrying a presolidified article out of an open mold for completion of the solidification. For instance, a hollow formation is extruded to suspend vertically into an open mold space. The mold is closed about a segment of the hollow formation, leaving an opening at any suitable place in the otherwise closed mold open, and a blow pipe is then introduced into said opening, for instance, from below or from above, and admits fluid pressure to the fully enclosed segment. Such blow pipe is used according to the present invention, upon opening of the mold, to carry a presolidified article in vertical position out of the open mold space. Another blow pipe is used in the same manner while the first mentioned blow pipe is outside the mold. Wherever in this specification and in the appended claims, in connection with the function of blow pipes or cores, terms such as "supported," "seated" are used, they are intended to cover, for instance, a core entering a closed mold from above so that an incompletely solidified article will be suspended by the core, and a core entering the mold from below so that the presolidified article will rest on the core.

It will be apparent that while I have shown and described my invention in a few forms only many changes and modifications may be made without departing from the spirit of the invention defined in the following claims.

I claim:

1. A method of forming hollow plastic articles, comprising
    (1) providing a continuous hollow preform of plastic material in condition of plasticity to permit expansion and setting in predetermined form,
    (2) placing a length of said preform into the space between open opposing sections of a mold, said length having a longitudinal axis, said placing being done so that said axis extends vertically, said mold defining, when closed, a cavity conforming in shape to the article to be formed,
    (3) closing the open mold, thereby forming an inflatable embryo article within the closed mold,
    (4) admitting a fluid pressure medium to said embryo article, thereby expanding said embryo article into molding contact with said cavity,
    (5) opening the closed mold at a time when the expanded or blown article has reached a self-supporting but still incompletely solidified state, the incompletely solidified article having an axis coinciding with said first named axis,
    (6) having said incompletely solidified article supported by a first core, withdrawing said first core together with said incompletely solidified article from the open mold, the axis of said incompletely solidified article moving during said withdrawing parallel to itself and, thus, remaining vertical,
    (7) allowing the withdrawn incompletely solidified article to solidify to completion in vertical condition outside the mold,
    (8) placing a fresh length of said preform into the open mold, repeating the steps leading to the conversion of said fresh length over a fresh embryo article into a freshly blown incompletely solidified article and to the completion of the solidification of said fresh incompletely solidified article, thereby having said fresh incompletely solidified article supported by a second core, and
    (9) taking a completely solidified article off said first core.

2. In the method according to claim 1, placing a length of said preform into the space between open opposing sections of each mold of as many molds as there are lengths to be simultaneously placed into the open molds, and using two groups of cores, each of said groups including as many cores as there are preforms.

3. In the method according to claim 1, having said first core extend vertically from outside the mold into the open mold to support said length, said embryo article, and said incompletely solidified article, withdrawing from the open mold said first core having said incompletely solidified article seated thereon, holding said first core in vertical condition during said withdrawing and while said incompletely solidified article solidifies to completion, and having said second core extend vertically from outside the mold into the open mold to support said fresh length, said fresh embryo article, and said freshly blown incompletely solidified article.

4. In the method according to claim 1, having said first core, upon said admission of a fluid pressure medium extend vertically from outside the mold into the closed mold through a mold opening leading to said cavity, opening the closed mold, withdrawing from the open mold in vertical condition said first core having said incompletely solidified article seated thereon, holding said first core in vertical condition while said incompletely solidified article solidifies to completion, and having said second core, upon renewed admission of fluid pressure, extend vertically from outside the mold into the closed mold.

5. A method of forming hollow plastic articles, comprising
   (1) continuously extruding from an extrusion nozzle a tubing of plastic material to suspend downwardly toward the space between open opposing sections of a mold, said tubing having a longitudinal axis, said material being in a condition of plasticity, said mold defining, when closed, a cavity conforming in shape to the article to be formed,
   (2) having a first core extend from outside the mold into the open mold to receive an end portion of said tubing,
   (3) closing the open mold, thereby forming out of a length of said tubing an inflatable embryo article within the closed mold,
   (4) admitting a fluid pressure medium to said embryo article, thereby expanding said embryo article into molding contact with said cavity,
   (5) opening the closed mold at a time when the expanded or blown article has reached a self-supporting but still incompletely solidified state, the incompletely solidified article having an axis coinciding with said first named axis,
   (6) withdrawing from the open mold said first core having said incompletely solidified article seated thereon, the axis of said incompletely solidified article moving during said withdrawing parallel to itself and, thus, remaining vertical,
   (7) allowing the withdrawn incompletely solidified article to solidify to completion in vertical condition outside the mold,
   (8) having a second core extend from outside the mold into the open mold to receive another end portion of said tubing,
   (9) repeating the steps leading to the conversion of a fresh length of tubing over a fresh embryo article into a freshly blown incompletely solidified article, and to the completion of the solidification of said fresh incompletely solidified article, and
   (10) taking a completely solidified article off said first core.

6. In the method according to claim 5, severing a length from said tubing, supporting the severed tubing length at the severed end, transferring said severed tubing length into the open mold to have an end portion of said length slip over said first core.

7. In the method according to claim 1, continuously extruding from an extrusion nozzle a tubing of plastic material to suspend downwardly, having a portion thereof at the free tubing end slip over said first core extending opposite to and in alignment with the direction of extrusion, severing a length from said tubing, supporting the severed tubing length at the severed end, transferring said first core and said severed length into the open mold space, effecting the steps leading to the conversion of the transferred length over said embryo article into said incompletely solidified article, and to the completion of the solidification of said incompletely solidified article, having another end portion of the tubing slip over said second core during effectuation of said conversion steps, and transferring said second core and a freshly severed tubing length into the open mold space, said withdrawing and second named transferring being effected simultaneously.

8. In the method according to claim 7, said transferring and withdrawing being effected along circular arcs, arranging for said first core and said incompletely solidified article to travel along a circular arc through at least a single solidification station, and using as many additional cores as there are solidification stations.

9. A method of forming hollow plastic articles, comprising
   (1) continuously and downwardly extruding a first and second tubing from a first and second extrusion nozzle, respectively, to suspend spacedly,
   (2) having an end portion of said first tubing slip over a first core, said first core being in alignment with the direction of extrusion of said first tubing,
   (3) severing a length from said first tubing, said length having a longitudinal axis,
   (4) supporting the severed length at the severed end,
   (5) withdrawing from the space between open opposing sections of a mold a second core having a previously blown incompletely solidified article seated thereon in vertical condition to become aligned with the direction of extrusion of said second tubing,
   (6) transferring said first core together with said severed length into the open mold space, while being supported at the severed end,
   (7) said withdrawing and transferring being simultaneously effected,
   (8) placing said severed length within the open mold so that said axis extends vertically,
   (9) closing the open mold, thereby forming an inflatable embryo article within the closed mold,
   (10) admitting a fluid pressure medium to said embryo article, thereby expanding said embryo article into molding contact with a mold cavity,
   (11) opening the closed mold at a time when the thus expanded or blown article has reached a self-supporting but still incompletely solidified state, said second named incompletely solidified article having an axis coinciding with said first named axis,
   (12) withdrawing said first core having said second named incompletely solidified article seated thereon from the open mold to become aligned with the direction of extrusion of said first tubing,
   (13) taking a completely solidified article off said second core, and
   (14) having an end portion of said second tubing slip over said second core, and effecting the severing, supporting, and transferring of a length of said second tubing.

10. A method of forming hollow plastic articles, comprising
   (1) continuously and downwardly extruding from an extrusion nozzle a tubing of plastic material while in condition of plasticity,
   (2) introducing a length of said tubing into the space between open opposing sections of a mold, said length having a longitudinal axis, said placing being done so that said axis extends vertically, said mold defining, when closed, a cavity conforming in shape to the article to be formed,
   (3) closing the open mold, thereby forming an inflatable embryo article within the closed mold,
   (4) admitting a fluid pressure medium to said embryo article, thereby expanding said embryo article into molding contact with said cavity,
   (5) having a first core extend from outside the mold into the mold to support the expanded or blown article in vertical condition,
   (6) opening the closed mold at a time when said blown article has reached a self-supporting but still incompletely solidified article having an axis coinciding with said first named axis,
   (7) withdrawing said first core having the incompletely solidified article seated thereon from the open mold, the axis of said incompletely solidified article moving during said withdrawing parallel to itself and, thus, remaining vertical,
   (8) allowing the withdrawn incompletely solidified article to solidify to completion in vertical condition outside the mold, (9) introducing a fresh length of said tubing into the open mold space, the axis of said fresh length extending vertically, said withdrawing and said second named introducing being simultaneously effected,

(10) repeating the steps leading to the conversion of said fresh length over a fresh embryo article into a freshly blown incompletely solidified article, using a second core to extend into the closed mold to support said fresh incompletely solidified article,

(11) taking a completely solidified article off said first core, and

(12) repeating the steps leading to the completion of the solidification of said fresh incompletely solidified article.

No references cited.

ROBERT F. WHITE, *Primary Examiner.*